J. L. Mason,
Forming Sheet-Metal Screw-Threads.
Nº 17,437.
Patented June 2, 1857.

UNITED STATES PATENT OFFICE.

JOHN L. MASON, OF NEW YORK, N. Y.

IMPROVEMENT IN MANUFACTURING SCREWS OF THIN METAL.

Specification forming part of Letters Patent No. 17,437, dated June 2, 1857.

*To all whom it may concern:*

Be it known that I, JOHN L. MASON, of the city, county, and State of New York, have invented a new and Improved Mode of Manufacturing Screws of Comparatively Soft and Thin Metal, particularly adapted for nozzles and caps of bottles, jars, lanterns, &c., by which the screw is produced without cutting away the metal or impairing its strength; and the following is a full description of the manner in which I effect or perform the same, viz:

I prepare a chuck, which I place in an ordinary lathe, and opposite to this and in line with it I place on the spindle another chuck or disk so arranged that a flat circular piece of sheet metal can be compressed and held between them in a manner known to all machinists. The convex part of the first chuck has upon it the form of the screw desired. I then give revolution to the chucks and disk of sheet metal, and while revolving I press a dull tool laterally against that portion of the side or face of the piece of sheet metal which extends outside of the diameter of the chuck. By continuing this pressure and revolution the disk of sheet metal will gradually assume the form of a cup fitting closely over the outer helices of the screw on the chuck. When this form has been given, I apply the point of a tool formed like a section of the screw-thread or of the groove between the threads while the revolution is continued, and by pressing this tool upon the concave side of the cup the cup is pressed into the form of the screw on the mandrel or chuck. If a nozzle is required I cut the bottom from the screw-cup thus formed; but if a cap is required the bottom of the cup is left.

The foregoing I consider the best mode of forming screw nozzles, caps, &c.; but it is obvious that other modes may exist of giving the cup form to the thin metal. It is further obvious that after the metal is reduced to the form of a cup or hollow cylinder or hollow cone, it may then be placed upon the screw-chuck and the screw produced, as above described. It is also obvious that this cup, cylinder, or cone may be placed within a hollow chuck or mandrel having a female screw cut on its interior concave surface, and that by the application of a proper tool the threads may be produced; but I consider these less perfect and less profitable modes of procedure, and thus do not recommend them, but only mention them as involving the principal of my invention.

Figure 2:
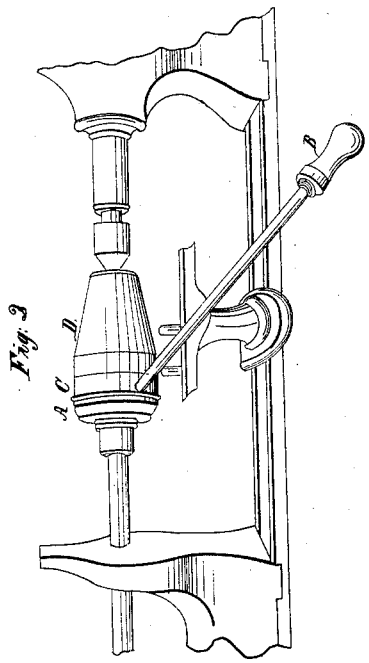
Figure 3:
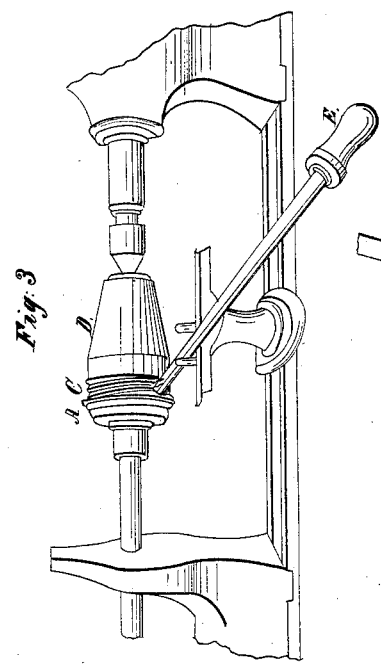
Figure 4:
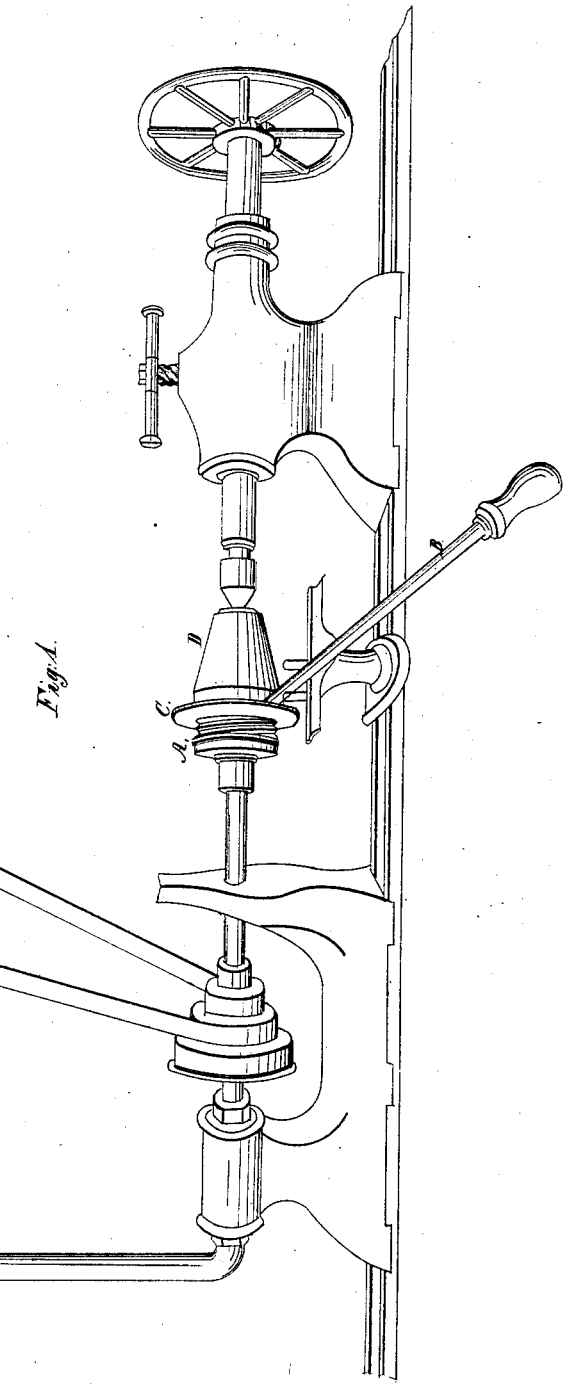

In the accompanying drawings, Figure 1, A B C D represent the chucks, tool, and circular sheet of metal. Fig. 2 represents the metal in cap form. Fig. 3 represents the chucks and tool by which the screw is made and the screw-cap thereon.

What I claim as my invention, and desire to secure by Letters Patent, is—

The mode herein described of forming screw-threads on cups, hollow cylinders, or hollow cones of thin soft metal, substantially as described.

JOHN L. MASON. [L. S.]

Witnesses:
JOHN A. GUNN,
JOHN LAVERTY.